United States Patent
Ganji et al.

(10) Patent No.: US 7,275,073 B2
(45) Date of Patent: Sep. 25, 2007

(54) SYSTEM AND METHOD FOR NOTIFYING MOBILE DEVICES BASED ON DEVICE TYPE AND NETWORK CAPABILITIES

(75) Inventors: Kiran Ganji, Irving, TX (US); Raghuveer Boinapalli, Irving, TX (US)

(73) Assignee: Good Technology, Inc., Santa Clara, CA (US)

( * ) Notice: Subject to any disclaimer, the term of this patent is extended or adjusted under 35 U.S.C. 154(b) by 406 days.

(21) Appl. No.: 10/430,943

(22) Filed: May 7, 2003

(65) Prior Publication Data

US 2004/0225693 A1   Nov. 11, 2004

(51) Int. Cl.
    *G06F 17/30* (2006.01)
(52) U.S. Cl. .................. 707/201; 707/204; 455/455; 455/456.1; 455/456.2; 455/456.3; 455/456.5
(58) Field of Classification Search ........ 707/201–204; 709/223–224; 719/318; 455/456.1–456.6
See application file for complete search history.

(56) References Cited

U.S. PATENT DOCUMENTS

| | | | | |
|---|---|---|---|---|
| 6,148,410 | A * | 11/2000 | Baskey et al. ................. | 714/4 |
| 6,636,873 | B1 * | 10/2003 | Carini et al. ................. | 707/201 |
| 6,901,415 | B2 * | 5/2005 | Thomas et al. ............. | 707/203 |
| 6,912,395 | B2 * | 6/2005 | Benes et al. ............. | 455/456.1 |
| 7,031,956 | B1 * | 4/2006 | Lee et al. ....................... | 707/3 |
| 7,197,288 | B1 * | 3/2007 | Ngan et al. ............... | 455/186.1 |
| 2002/0132609 | A1 * | 9/2002 | Lewis et al. ................ | 455/412 |
| 2003/0050046 | A1 * | 3/2003 | Conneely et al. ........... | 455/412 |
| 2005/0144293 | A1 * | 6/2005 | Limont et al. .............. | 709/228 |
| 2005/0289243 | A1 * | 12/2005 | McInerney .................. | 709/248 |
| 2006/0235898 | A1 * | 10/2006 | Loveland .................... | 707/200 |

\* cited by examiner

*Primary Examiner*—Don Wong
*Assistant Examiner*—Hanh Thai
(74) *Attorney, Agent, or Firm*—Blakely Sokoloff Taylor & Zafman LLP

(57) ABSTRACT

A system, method and computer architecture for synchronizing data between one or more enterprise databases and one or more mobile devices is disclosed. The architecture comprises: one or more synchronization agents in communication with a plurality of enterprise databases, one or more monitoring agents in communication with the one or more enterprise databases where the monitoring agents are configured to monitor changes in the plurality of databases according to predetermined criteria, an events database accessible to the one or more monitoring agents for storing information relating to the changes, a synchronization database for storing information relating to synchronization events, a synchronization server in communication with a plurality of synchronization agents and the synchronization database where the synchronization server is adapted to receive communications from the mobile devices, and a notification server in communication with the events database and the synchronization database where the notification server is adapted to determine when to send notifications to the one or more mobile devices.

20 Claims, 5 Drawing Sheets

SYSTEM AND METHOD FOR NOTIFYING MOBILE DEVICES BASED ON DEVICE TYPE AND NETWORK CAPABILITIES

TECHNICAL FIELD

The invention relates in general to communication systems, and in particular to enterprise database change notification being sent to mobile devices based on device type and network capabilities.

BACKGROUND INFORMATION

Intelligent mobile devices including personal digital assistants ("PDA"s), smart phones, and small hand-held computers are becoming more common. Use of these mobile devices is no longer limited to technologically savvy professionals and increasingly these devices are being integrated into conventional business processes such as parcel delivery.

Customer lists, contact information, appointment schedules, etc., and other data important to a company may be stored in the enterprise database (e.g., the database or databases used by the corporate headquarters or divisional office). This information changes often, and the usefulness of intelligent mobile devices depends upon these mobile devices being notified as the information changes. Notification is the process in which a server program (e.g. a notification server) alerts a mobile device about a change in the enterprise data.

Individual employees within the company may employ different types of mobile devices and may require different notification interval requirements (e.g. some employees may need almost instantaneous notification while other employees may require notification only on a daily basis).

Current notification and synchronization solutions are not usually efficient because they typically serve only a specific device type and do not accommodate different types of mobile devices. Thus, the ability for one user to maintain multiple disparate mobile devices enabled and synchronized with enterprise data is typically not supported.

Current solutions often rely on the insecure and bulky model of replicating enterprise data outside of the enterprise. Such a model may be insecure because data stored outside of the enterprise databases may be more vulnerable to undesired disclosure. The model is bulky because large data stores may be employed to store the duplicated data. Additionally, current solutions typically do not provide the ability to detect if a mobile device is switched off or out of coverage and to stop notifying the device of enterprise database changes to prevent air-time loss.

Additionally, current solutions do not provide a mechanism for avoiding network flooding (i.e. when a large number of mobiles are all notified at once a large volume of network message traffic is loaded onto a corporate network). This large volume of network message traffic may cause undesirable delays in serving the needs of other users of the corporate network. Depending on the link layer protocol employed within the network and the physical routing of network links (depending on the topology of the network), the impact of this overloading of the network may cause the overall data throughput to drop off sharply as attempts to transmit create collisions and ensuing retransmission attempts contribute to the network flooding and further increase collisions.

What is needed, therefore, is a system and method for performing intelligent notification of mobile devices based on the mobile device type, such a system may notify based on network capabilities, the type of mobile device, or the status of the mobile device.

SUMMARY OF THE INVENTION

Embodiments of a communication system for notifying an intelligent mobile device of changes in a database are disclosed. A system, method and computer architecture for synchronizing data between one or more enterprise databases and one or more mobile devices is disclosed. The architecture comprises: one or more synchronization agents in communication with a plurality of enterprise databases, one or more monitoring agents in communication with the one or more enterprise databases where the monitoring agents are configured to monitor changes in the plurality of databases according to predetermined criteria, an events database accessible to the one or more monitoring agents for storing information relating to the changes, a synchronization database for storing information relating to synchronization events, a synchronization server in communication with a plurality of synchronization agents and the synchronization database where the synchronization server is adapted to receive communications from the mobile devices, and a notification server in communication with the events database and the synchronization database where the notification server is adapted to determine when to send notifications to the one or more mobile devices.

DETAILED DESCRIPTION OF THE INVENTION

The present disclosure describes unique methods and systems for performing "intelligent" notification of mobile devices based on the mobile device type, based on network capabilities, or based on individual user notification period requirement. It is understood, however, that the following disclosure provides many different embodiments, or examples, for implementing different aspects of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
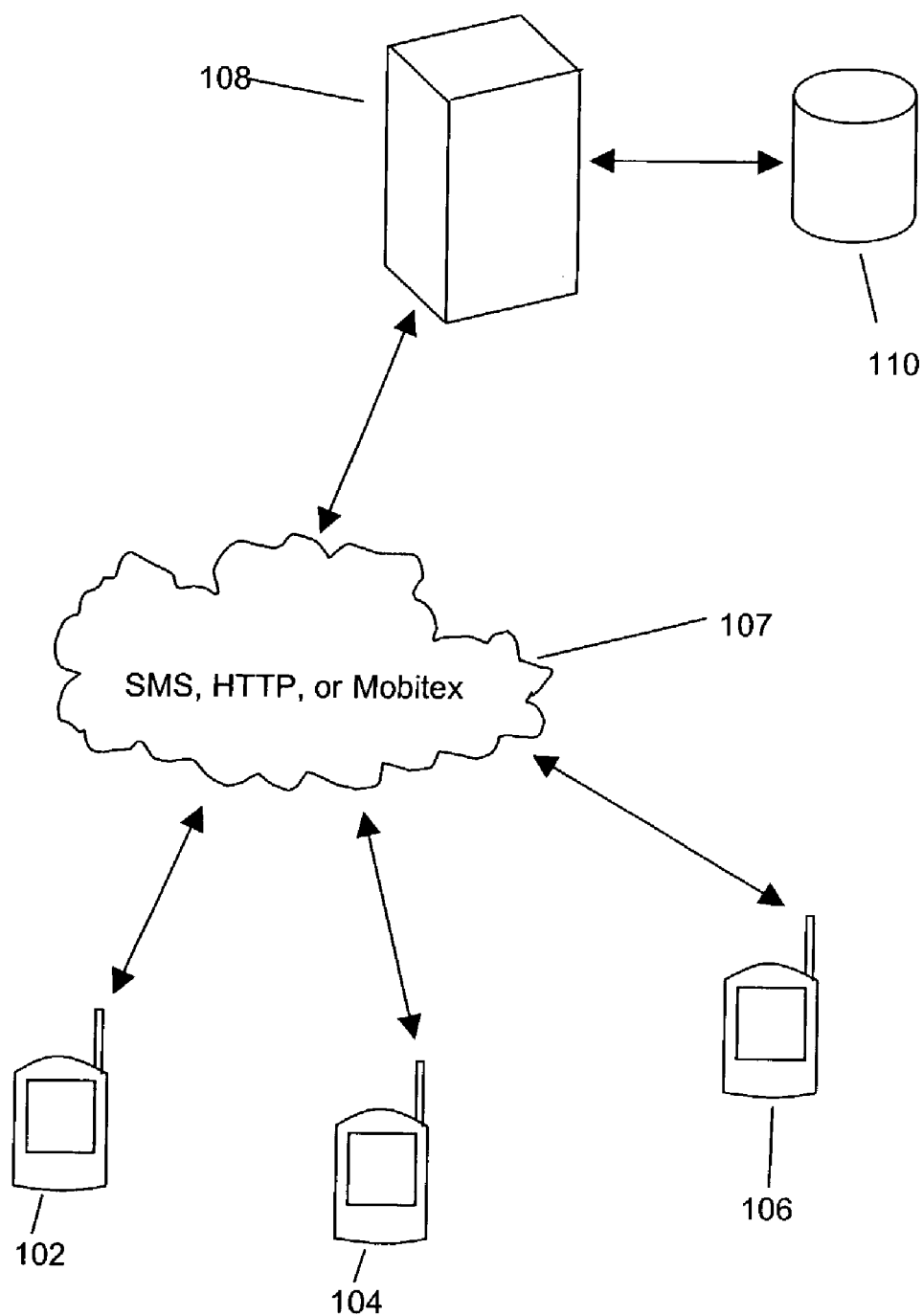
FIG. 1 depicts an exemplary system for implementing various embodiments of the present invention.

Turning now to FIG. 1, an exemplary communication system 100 is illustrated which may implement various embodiments of the present invention. Mobile devices 102, 104, and 106 are shown in communication with a network 107. The mobile devices 102, 104, and 106 may be different type devices. A mobile server 108 (e.g. a software program or a dedicated computer running a software program) may be in communication with an enterprise database 110. The mobile server 108 may communicate with the mobile devices 102, 104, and 106 the network 107. Depending on the network and other factors, the mobile server 108 may communicate with the mobile devices 102, 104, and 106 via one of a number of network protocols, such as simple message service ("SMS"), hypertext transport protocol ("HTTP"), or Mobitex.

Figure 2:
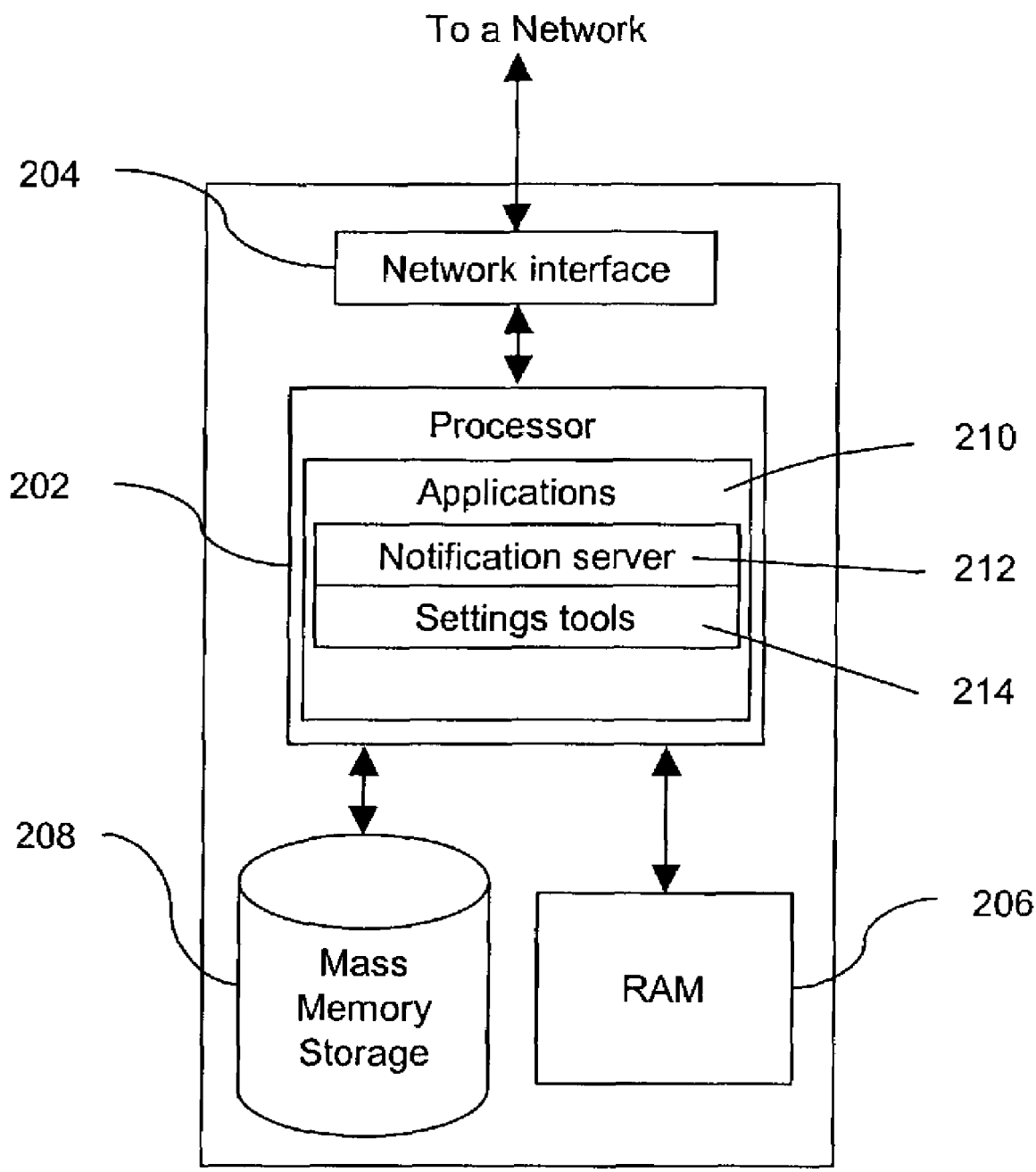
FIG. 2 depicts an exemplary mobile server.

Turning now to FIG. 2, an exemplary mobile server 200 is depicted as a dedicated computer. However, the mobile server 200 may also be a software program running on a computer. In the illustrative embodiment, a processor 202 controls the functions of the mobile server 200. A network interface 204, coupled to the processor 202, may provide access to the enterprise database 110 (FIG. 1), the network 107 (FIG. 1), the Internet or other networks (not shown). A random access memory ("RAM") 206 may also be in communication with the processor 202. The RAM 206 may temporarily store programs or portions of programs which are ready for execution by the processor 202 as well as intermediate results of the computations of the processor 202. A mass storage device 208 may also be in communication with the processor 202. The mass storage device 208 may allow the processor to store large volumes of data. The mobile server 200 may execute computer programs or applications 210 which may be necessary to manage communication to the mobile devices. Such applications or sub-applications 210 may include a notification server 212 and setting tools 214 (e.g., applications which provide tools to set-up communication parameters and notification application operational parameters.

Figure 3:
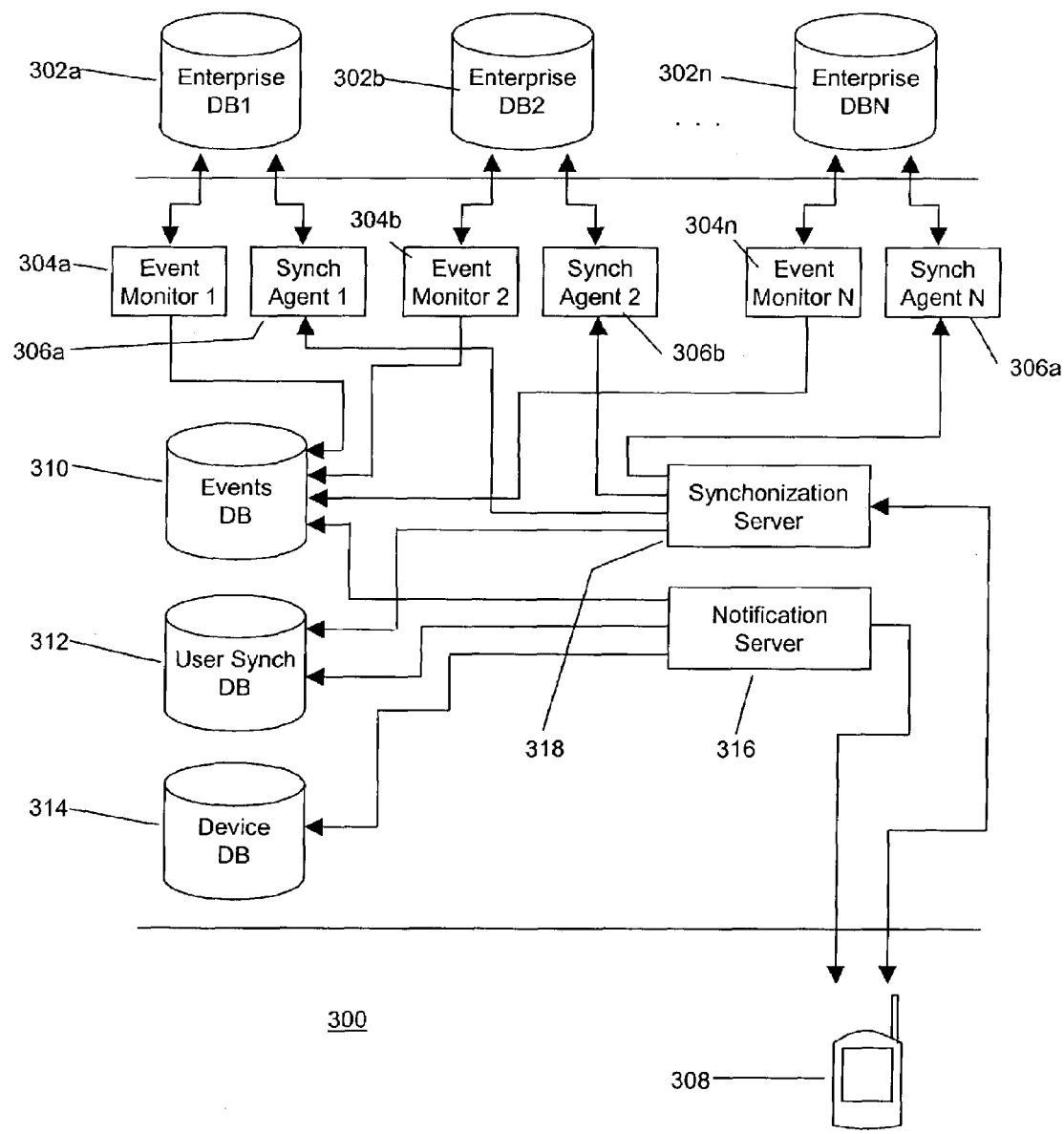
FIG. 3 depicts portions of the functional architecture of one embodiment of the present invention.

Turning now to FIG. 3, portions of an exemplary architecture 300 which may be used in conjunction with the mobile server 200 are depicted. As previously discussed, a company or organization may have multiple enterprise databases 302a, 302b, to 302n. These databases 302a-302n may be associated with separate applications or may be shared by several applications. Changes or modifications to the enterprise database 302a may be tracked by an event agent or "monitor" 304a. Similarly, changes to the enterprise databases 302b to 302n may be tracked by event monitors 304b to 304n, respectively. The event monitors may be dedicated events agent software programs or tasks associated one-to-one with each enterprise database 302a to 302n. The event monitors 304a to 304n may interface with the enterprise databases by connector modules defined by the enterprise database vendors.

An events database 310 may be in communication with the respective event monitors 304a, 304b to 304n. In one embodiment, for each event tracked by the event monitors 304a-304n, the respective event monitor generates an event record in the database 310. The events database 310 may retain the recorded event for a configurable length of time, after which time excessively dated events may be deleted from the database 310. An event record may include the following information: user identification, time of the event, the event identification (indicating the server side identification for the event which underwent modification), and event type (indicating the type of change e.g., new/modification/delete).

A notification server 316 periodically scans the events database 310 for recent event for each user. When the notification server 316 finds the most recent event for the user, it checks the last notification time for each of the user's mobile devices in a user synchronization database 312. If all mobile devices have a last notification time later than the most recent event, then it can be assumed that all the user's mobile devices have been notified. If one or more devices have older last notification dates, then these mobile devices are flagged to receive notification of a database change, and the notification server places an alert which references back to the event on an alerts queue for each of these mobile devices.

A notification message reader, part of the notification server 316, may periodically read the alerts queue. As the events are read from the alert queue, the device type may be checked and relevant information about the device type is read from a device database 314. The device database 314 may store information characterizing individual devices served by this notification mechanism. In one embodiment, a device record may contain the device identification, device type, and event type. The notification server 316 can then determine the appropriate alert for the type of device. The device database 314 may also contain other relevant information (e.g.: SMS message address, or the HTTP post address for RIM devices) so that alert messages may be sent. The notification message reader uses this information to notify the device by a mechanism most appropriate for that device type—by SMS, HTTP, Mobitex, or other mechanisms. The notification server 316 then may also update the last notification time for the associated mobile device record in a user synchronization database 312.

Thus, the notification server 316 may use the events database 310, the user synchronization database 312, and the device database 314 to create notifications which may be sent to the mobile devices.

Synchronization agents 306a to 306n may be in communication with a synchronization server 318. In the illustrative embodiment, the synchronization server 318 is also in communication with the user synchronization database 312. The synchronization agents 306a, 306b, to 306n may access data from the respective enterprise database 302a-302n for transmitting to the mobile device 308. Note that the synchronization agents may be dedicated synchronization software tasks associated one-to-one with each enterprise database 302a to 302n. The synchronization agents 306a to 306n may interface with the enterprise databases by connector modules defined by the enterprise database vendors.

The user synchronization database 312 may store information relating to an individual mobile user's synchronization, such as his preferences. Such information may include user identification, device identification, most recent synchronization time, most recent notification time, and application type. Note that in one embodiment, a single user who has several mobile devices served by this notification mechanism may be associated with multiple records in the user synchronization database 312.

When the mobile device 308 actually synchronizes, it communicates with the synchronization server 318. In one embodiment, the synchronization server 318 supports "pulling" data from the enterprise databases 302a-302n via the appropriate synchronization agent and sending data to appropriate mobile device. Thus, the synchronization server 318 may interact with the appropriate synchronization agent 306a to 306n to fetch the user data from the enterprise databases 302a-302n. The synchronization server 318 then pushes this data out to the appropriate mobile device 308 and updates the last synchronization time for the mobile device in the user synchronization database 312, which may be the confirmation that the mobile device actually completed synchronization.

Software routines and tools allow for the configuration of notification for specific user needs. This entails entering new records or modifying existing records of data in the user synchronization database 312 and in the device database 314. The tools may be accessible via the Internet or another network. The tools may include mechanisms to make notification configuration secure and to manage the rate of alert notification transmittals when the alerts queue is heavily loaded to prevent enterprise network floods which degrade the functionality of the enterprise network. For instance, if a configurable maximum number of alerts had been sent out in a unit of time, the transmission of additional notifications may be suspended for a configurable number of seconds. Additionally, notifications may be resent if a mobile device does not synchronize in a timely fashion. This aspect provides for the occasion when a mobile device has been powered off or has been out of coverage and hence was unable to receive notification to synchronize.

Figure 4:
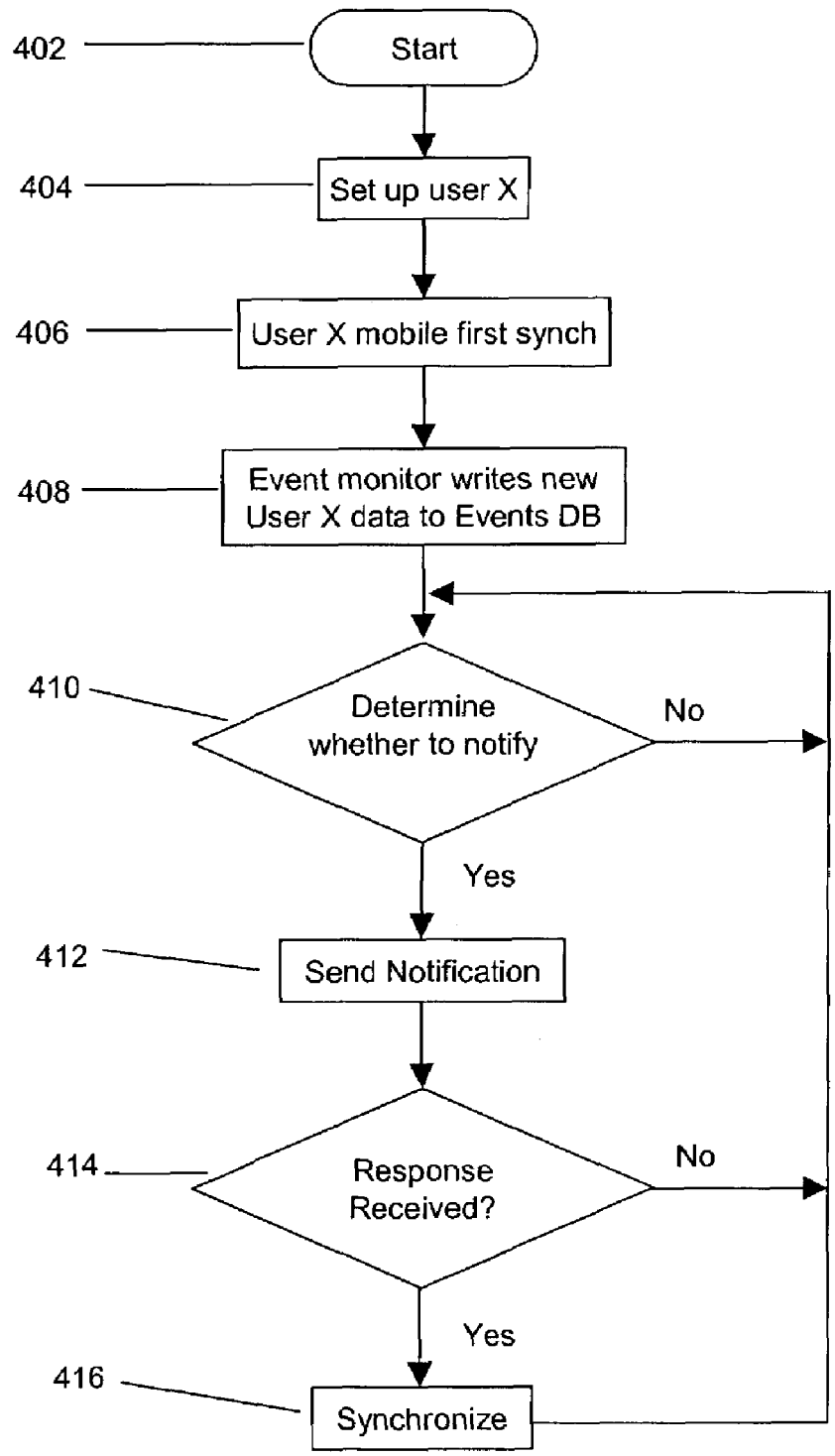
FIG. 4 depicts a process flow diagram illustrating a possible notification scenario.

Turning now to FIG. 4 a process flow diagram 400 depicts one aspect of an exemplary intelligent notification sequence for an exemplary user "X." The process begins at step 402 and flows to step 404 in which the mobile user X's intelligent notification service is initially "set up" or configured and user X is "registered." Thus, in one embodiment, the configuration may include setting up the mobile devices and notifying the event monitors 304*a* to 304*n* to begin watching the enterprise databases for activity associated with user X. The notification server 316 and the synchronization server 318 may be set up to communicate with the relevant event monitors and synchronization agents, and common databases (e.g., the events database 310, the synchronization database 312 and the device database 314). As an example during the initial configuration, entries may be made in the synchronization database 312 for each of user X's devices identifying user X, the mobile device, a default last synchronization time, and a default last notification time. Entries may also be made for each of user X's devices in the device database 314 identifying the mobile device, the mobile device type, the type of database change events to notify the device about, and the device's address. When initially populating these databases, default time values may be used. Additionally, the event monitors (one of which may be the event monitor 302*a*) may be configured to watch for modifications in the relevant enterprise databases for user X. Note, for purposes of the notification sequence depicted in FIG. 4, user X is assumed to have only one mobile device configured for intelligent notification service.

The process then flows to step 406 in which an initial synchronization occurs. Such a synchronization may be a manual or automatic synchronization. This synchronization may cause data to be sent to the mobile device and may overwrite the default time data for user X in the appropriate databases.

In step 408, it is assumed a change occurs in the enterprise database 302*a* associated with user X. As previously described, an event monitor (for instance, event monitor 304*a*) detects this change and inserts a new record associated with this change in the events database 310.

As described previously, the notification server 316 periodically monitors the events database. As will be explained in detail with reference to FIG. 5, the notification server 316 monitors the events database and performs a series of checks to determine if a notification should be sent to the mobile device (step 410). If the notification server determines that it is not appropriate to notify the mobile device, the process loops back so that the notification server can continue to monitor the events database 310.

On the other hand, if the notification server 316 determines that a notification should be sent, the process flows to step 412 where a notification is sent to the mobile device.

In step 414, the synchronization server 318 determines whether a response has been received. If a response has not been received, the process loops back to step 410 where the notification monitor continues to monitor for updates which regarding user X. On the other hand, if a response has been received from the appropriate mobile device, the mobile device is synchronized in step 416. The appropriate enterprise data may be sent to the mobile device, and any data received from the mobile device may be sent to the appropriate synchronization agent 306*a* to 306*n* to be added to the enterprise databases. The synchronization time may then be added to the synchronization database 312.

Figure 5:
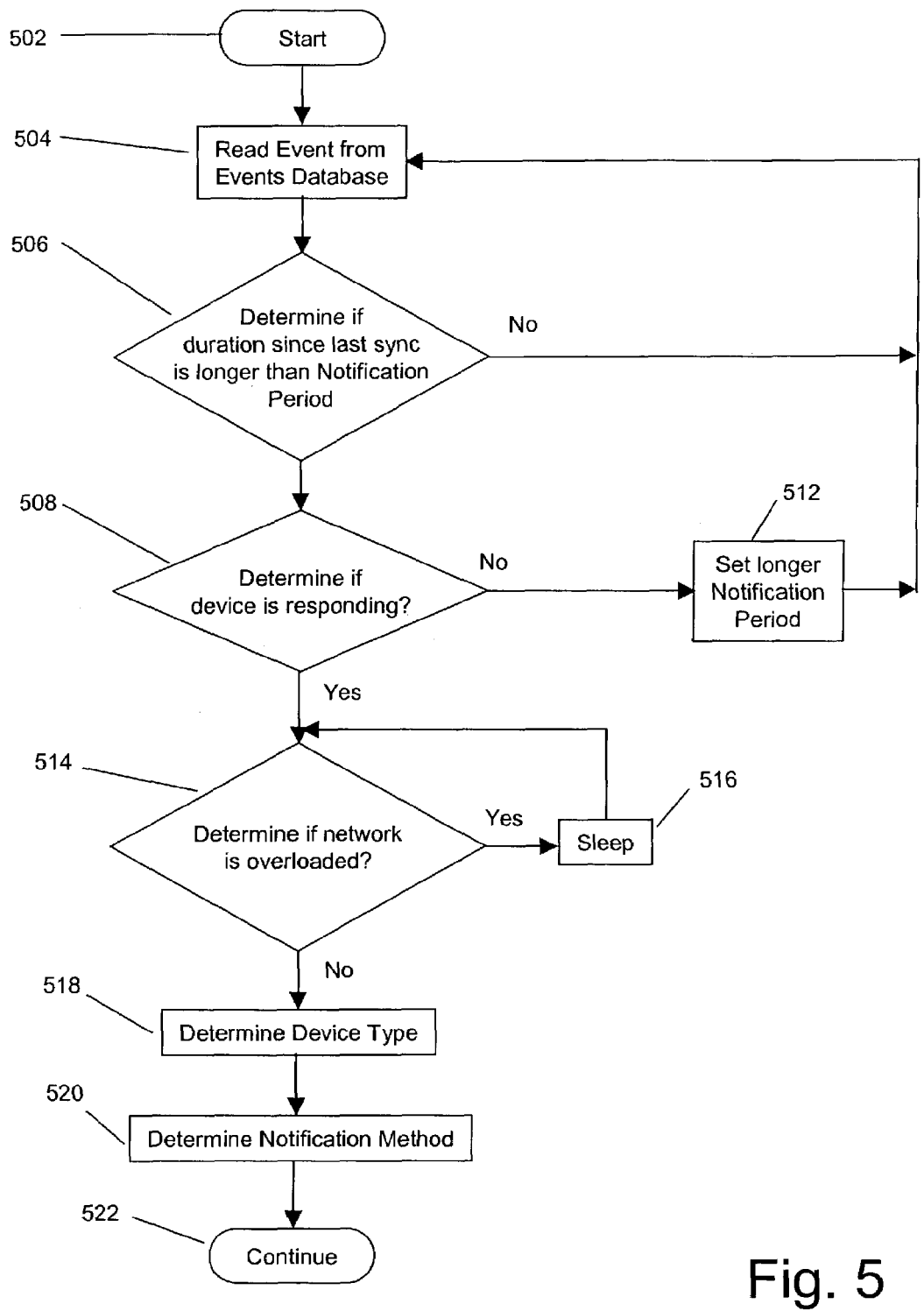
FIG. 5 completes the process flow diagram begun in FIG. 4.

Turning now to FIG. 5, there is illustrated one method which could be employed by the notification server 316. The method starts at step 502, then flows to step 504 where the events associated with user X are scanned from the events database 310. Thus, the previously recorded event (step 408 of FIG. 4) is read. In step 506, the time duration since the last synchronization is compared to a "notification period." The notification period is a configurable time period to allow a user to receive notifications no more frequently than a specific "notification" period (e.g. no more often than once an hour). If the duration is not longer than the notification period, the process flows back to step 504 where the events database continues to be monitored. On the other hand, if the duration is longer than the notification period, the process flows to step 508.

In step 508 the process determines whether the mobile device is responding. In one embodiment, this determination may be performed by comparing the last synchronization time with the last notification time. If the last synchronization time is older than the last notification time, there is an indication that the mobile device has not responded to the last notification by synchronizing. This means the mobile device may be out of coverage or is powered off. Thus, sending additional notifications may be a waste of bandwidth. The notification period, therefore, may be lengthened (step 512) when a mobile device has not synchronized within a configurable period, for example twelve hours. Thus notification period may be expanded to, for example, every six hours. This aspect creates an efficient use of bandwidth if the mobile device remains powered off or out of coverage. Alternatively, when the user powers on or comes back into coverage, he may perform a manual synchronization. If the last synchronization time is more recent than the last notification time, the notification server may create an alert and a notification may be sent to the mobile as described above.

Turning back to step 508, if the mobile device is responding as configured, the process flows to step 514 where the notification server determines if the network is overloaded or whether network clogging is occurring. In one aspect, if the number of items on an alert queue is greater than a configurable number, the notification server "sleeps" with respect to the notification for a configurable amount of time. This "sleeping" allows a notification message reader to have a chance to empty the alerts queue and allows the network to stabilize. Thus, if the network is overloaded, the process flows to step 516 where the notification sleeps for a predetermined period of time. Otherwise, the process flows to step 518.

In the illustrative embodiment, several checks may be performed (steps 506 through steps 514) to determine if a notification should be sent. Once it has been determined that the notification should be sent, in step 518, an inquiry may be made to determine the device type from the device database 314 (FIG. 3). In step 520, the method for sending the notification may be made based on the device type. For instance, if the mobile device is a smart phone, an SMS message may be employed. The process may then continue in step 522.

As explained previously, in an exemplary embodiment, after the notification server 316 executes the process illustrated in FIG. 5, the process may continue as explained in reference to FIG. 4. Thus, the synchronization server 318 determines whether a response has been received. If a response has not been received, the notification server continues to monitor for updates regarding user X. On the other hand, if a response has been received from the appropriate mobile device, the mobile device is synchronized. The appropriate enterprise data may be sent to the mobile device, and any data received from the mobile device may be sent to the appropriate synchronization agent to be added to the enterprise databases.

The present invention offers several improvements over the current art for mobile device data synchronization. For example, another embodiment of the present invention supports sending the changed data without a notification, thus pushing the data out to the mobile device rather than stimulating the mobile device to pull the data. This behavior would be supported only for "always on" mobile device types. When the notification server is preparing to send a notification to such an "always on" device, rather than preparing and sending a notification, instead the notification server invokes the synchronization server as would the mobile to initiate its own pull of data. The result is that an unsolicited push of the changed data may be transmitted to the mobile device.

The invention's several embodiments support the currently known multiple mobile device types but are also easily adapted to future mobile device types unknown today. The invention's several embodiments support multiple devices for a single user. The ability of this invention to minimize network flooding behavior may be a valuable attribute. The invention's several embodiments minimize waste of bandwidth by avoiding notifications when the mobile device is powered off or out of coverage. The invention's several embodiments avoid storage bloat and contribute to data security by not duplicating enterprise data.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A system comprising:
   one or more synchronization agents in communication with one or more enterprise databases;
   one or more monitoring agents in communication with the one or more enterprise databases, to monitor changes in the one or more enterprise databases according to a predetermined criteria;
   an events database accessible to the one or more monitoring agents to store information relating to the changes;
   a synchronization server in communication with the one or more synchronization agents to receive communications from one or more mobile devices;
   a synchronization database in communication with the synchronization server to store information relating to synchronization events; and
   a notification server in communication with the events database and the synchronization database to compare a last synchronization time for a mobile device with a last notification time for the mobile device, to increase a notification period for which the mobile device is notified of changes upon determining that the last synchronization time is older than the last notification time, and in response to the increased notification period, to delay sending notifications to the mobile devices.

2. The system of claim 1 further comprising: a device database in communication with the device database to store information relating to the one or more mobile devices.

3. The system of claim 2 wherein the notification server is further to scan the events database for a record relating to the changes.

4. The system of claim 2 wherein the notification server is further to determine if the one or more mobile devices is responding, if not, then to set a longer notification period.

5. The system of claim 2 wherein the notification server is further to determine if the network is overloaded, if yes, then to wait for a predetermined amount of time before notifying the one or more mobile devices, if not, then to send the notification to the one or more mobile devices.

6. The system of claim 2 wherein the notification server is further to determine a device type for the one or more mobile devices from the device database; and to determine a notification protocol for the device type from the device database.

7. The method of claim 6 wherein the determining of the notification protocol comprises determining a most suitable network channel protocol.

8. The method of claim 7 wherein the most suitable network channel protocol is selected from a group consisting of short message service, hypertext transfer protocol, and Mobitex.

9. A method comprising:
   determining if the network is overloaded, if yes, then waiting for a predetermined amount of time before notifying a mobile device of an amendment event, if not, then sending the notification to the mobile device;
   comparing a last synchronization time for a mobile device with a last notification time for the mobile device;
   increasing a notification period for which the mobile device is notified of the amendment event upon determining that the last synchronization time is older than the last notification time; and
   in response to the increased notification period, delaying sending the notification to the mobile device.

10. The method of claim 9 further comprising:
    determining a device type for the mobile device; and
    determining a notification protocol for the device type.

11. The method of claim 10 further comprising determining a most suitable network channel protocol.

12. The method of claim 11 wherein the most suitable network channel protocol is selected from a group consisting of short message service, hypertext transfer protocol, and Mobitex.

13. A method comprising:
    monitoring a database for changes to an enterprise database according to a predetermined criteria;

determining whether to notify a mobile device of a monitored modification, if not waiting before notifying;

notifying the mobile device of a monitored modification;

determining whether a response to the notifying was received, if not, then repeating the above monitoring, determining, and notifying;

sending the monitored modification such that the mobile device and the enterprise database are synchronized;

comparing a last synchronization time for a mobile device with a last notification time for the mobile device;

increasing a notification period for which the mobile device is notified of the monitored modification upon determining that the last synchronization time is older than the last notification time; and in response to the increased notification period, delaying sending a notification to the mobile device.

14. The method of claim 13 wherein the determining whether to notify the mobile device further comprises:

determining if the network is overloaded, if yes, then waiting for a predetermined amount of time before notifying the mobile device, if no, then sending the notification to the mobile device.

15. The method of claim 14 further comprising:

determining a device type for the mobile device;

determining a notification protocol for the device type; and sending the notification according to the notification protocol.

16. The method of claim 13 further comprising:

setting up the mobile device; and initially synchronizing with the mobile device.

17. A method comprising:

scanning a database for a record relating to an amendment event according to a predetermined criteria;

determining if the network is overloaded, if yes, then waiting for a predetermined amount of time before notifying the mobile device, if not, then sending the notification to the mobile device;

comparing a last synchronization time with a last notification time;

increasing a notification duration upon determining that the last synchronization time is older than the last notification time; and in response to the increased notification duration, delaying sending the notification to the mobile device.

18. The method of claim 17 further comprising:

determining a device type for the mobile device; and determining a notification method for the device type.

19. The method of claim 18 further comprising determining a most suitable network channel protocol.

20. The method of claim 19 wherein the most suitable network channel protocol is selected from a group consisting of short message service, hypertext transfer protocol, and Mobitex.

* * * * *